Nov. 26, 1935.　　　A. HANCHETT　　　2,022,037
DEHYDRATION OF CAUSTIC
Filed May 17, 1933
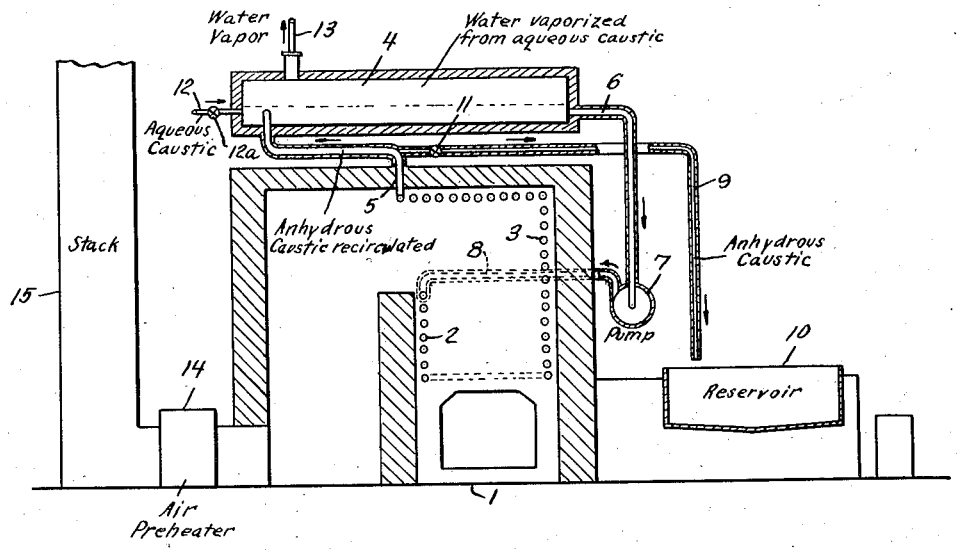
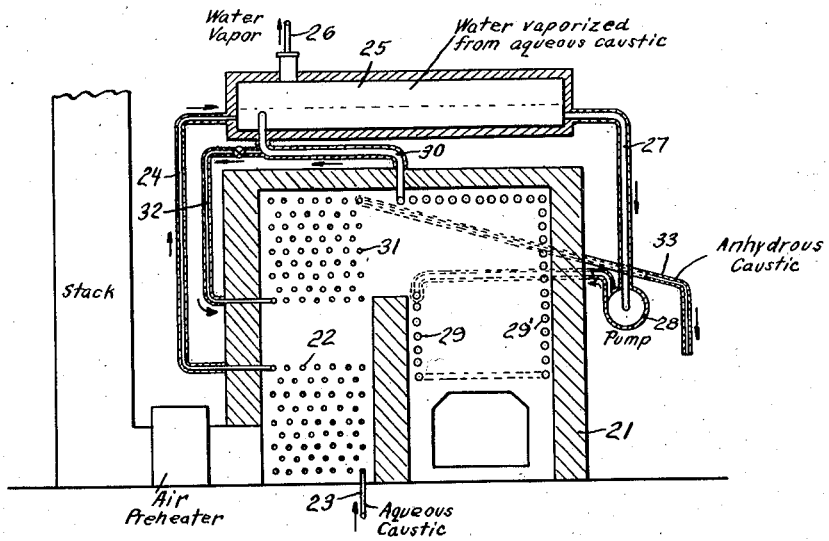
INVENTOR
Arnold Hanchett
BY
ATTORNEY Patented Nov. 26, 1935

2,022,037

UNITED STATES PATENT OFFICE 2,022,037

DEHYDRATION OF CAUSTIC

Arnold Hanchett, Syracuse, N. Y., assignor to The Solvay Process Company, Syracuse, N. Y., a corporation of New York Application May 17, 1933, Serial No. 671,466

15 Claims. (Cl. 23—184)

This invention relates to the concentration of liquid solutions and pertains more particularly to a method for the hehydration of aqueous solutions of caustic, such as sodium hydroxide and potassium hydroxide.

In the production of substantially anhydrous sodium hydroxide it is customary according to the present known methods to first concentrate the more dilute aqueous solutions of sodium hydroxide to 50–75% sodium hydroxide by evaporation with steam. Caustic liquor above this concentration, however, is very corrosive and consequently its further concentration or dehydration is generally accomplished by boiling it in a direct fired open cast iron pot. In order to completely remove the water, the caustic soda is heated to about 400° C. during this treatment. In order to improve the color of the caustic product and remove impurities with which it has become contaminated during the concentration, the temperature is ordinarily carried still higher. The caustic is then cooled slowly so as to permit the impurities, such as iron, to settle out. The substantially anhydrous caustic, when a suitable temperature is reached, is bailed out of the pot from the clear portion of the liquor, a portion being left in the pot so as not to bail out the settled impurities, etc.

It is an object of the present invention to carry out the dehydration of aqueous caustic solutions in a more efficient manner than heretofore and to effect the dehydration by a process which avoids contamination with impurities due to the corrosive effect of the sodium hydroxide.

In accordance with the present invention the aqueous solution of caustic to be dehydrated is not heated to the dehydration temperature by contact with a solid heating surface, such as that of a cast iron heating kettle, but is brought into contact with hot caustic of sufficient mass and temperature to raise the temperature of the caustic sufficiently to vaporize the water. Preferably the aqueous caustic is introduced into a body or stream of practically anhydrous caustic maintained at or above the temperature required for dehydration of the aqueous solution. The aqueous caustic solution may, if desired, be preheated prior to bringing it into contact with the hotter anhydrous caustic or it may be introduced at ordinary temperatures. In general it is preferred to introduce it in a liquid phase and consequently the temperature at which it is introduced may depend to some extent on the concentration of the solution. Thus, although sodium hydroxide solutions having a concentration up to 50% NaOH are liquid at ordinary temperature, solutions or hydrates containing, for example, 75% NaOH melt at a temperature considerably above atmospheric.

By employing practically anhydrous caustic for supplying heat to the aqueous caustic to be dehydrated, I am enabled to heat the aqueous caustic to the high temperature necessary for dehydration without bringing it into contact with highly heated metal surfaces. The practically anhydrous caustic employed for supplying heat to the aqueous caustic may be heated in contact with such surfaces with comparatively little corrosive effect. My process accordingly makes possible the production of a caustic product containing a less amount of impurities than obtainable by customary processes and also reduces the damage and loss of equipment because of corrosion.

My process also is applicable to the dehydration of other mixtures or solutions especially those that are more corrosive in their nature than the dehydrated products and the latter, i. e., the products, are fusible or may exist as liquids under the conditions of treatment, as for example, aqueous sodium and potassium hydroxide solutions.

According to my process a stream of substantially anhydrous caustic is circulated through a vapor separating chamber at a temperature sufficient to effect the dehydration of the aqueous caustic solution, for example a temperature of above about 350° C., and the aqueous caustic to be dehydrated is introduced into this circulating stream. A considerably larger quantity of the hot caustic is circulated in the chamber than is introduced as an aqueous liquid so that the introduction of the aqueous liquid does not objectionably reduce the temperature of the resultant mixture. Vapors of water liberated by the heat are withdrawn from the vapor separating chamber and may be condensed or otherwise disposed of as desired. The substantially water-free or anhydrous fused caustic, the temperature of which may be 20° to 40° lower than that of the entering concentrated caustic, provided it is sufficiently hot to remain in liquid phase, preferably above about 330° C., is then reheated and a portion thereof withdrawn and passed either to a bailing reservoir or to suitable after-treatment apparatus. The major portion, however, is returned to the vapor separating chamber.

In order that my invention may be more fully understood, recourse may be had to the following description of a specific embodiment thereof taken in connection with the accompanying drawing in which;

Fig. 1 illustrates, partly in section and partly in elevation, one apparatus for carrying out the process;

Fig. 2 illustrates in a similar manner an alternative apparatus for carrying out the process.

With special reference to Fig. 1 of the drawing, numeral 1 designates a furnace of suitable construction provided with pipe coils 2, 3 arranged to be heated by the hot gases of combustion generated in the furnace.

Located relatively close to the furnace there is provided a vapor separating chamber 4. This separating chamber may be, as shown, an elongated drum adapted for the passage therethrough from end to end of hot caustic. One end of the coils 2, 3 is connected by pipe 5 to one end of the vapor separating chamber 4. The other end of the vapor separating chamber is provided with an outlet pipe 6 for removing caustic therefrom to a pump 7. Pump 7 is in turn connected by a pipe 8 to the coils 2, 3. Pipe 5 may be provided with an outlet pipe 9 leading to a reservoir 10, or other suitable collector for collecting the product of the dehydration. A suitable valve 11 may be provided for regulating the amount of caustic withdrawn through pipe 9. If desired, a connection from pipe 6 or from pipe 9 may be provided so that part of the caustic passing through these pipes may also be withdrawn through pipe 9 instead of or together with caustic from pipe 5. Such a connection likewise should be provided with a regulating valve for controlling the flow of caustic therethrough. An inlet 12 for caustic soda to be dehydrated is provided at the same end of the vapor separating chamber as pipe 5. A valve 12a is shown for regulating the rate of flow of caustic solution to chamber 4. The vapor separating chamber 4 has a vapor outlet 13 for withdrawing water vapor or other vapors separated in the chamber 4.

The furnace 1 is shown as provided with preheater 14 in the stack 15 in known manner for preheating the air used for combustion in the furnace and other heat exchange equipment may, of course, be provided for utilizing the waste heat of the combustion gases.

This apparatus may be operated as follows:

A 50 to 75% aqueous sodium hydroxide solution is introduced into the vapor separating chamber 4 by means of inlet 12. Within the vapor separating chamber 4 there is maintained an adequate flow of dehydrated caustic at a temperature of about 400° C. The aqueous solution coming into intimate contact with the hotter substantially anhydrous caustic is immediately heated to a correspondingly high temperature and is freed from water vapor.

Preferably a sufficient flow of caustic is maintained in the vapor separating chamber so that the temperature drops in the vapor separating chamber 4 from about 400° C. only to about 360° to 380° C., say about 370° C. The quantity of caustic recirculated to maintain this high temperature will, of course, vary depending upon the amount of water contained in the caustic solution to be dehydrated as well as upon its temperature before being introduced into chamber 4, and may be controlled by suitably regulating the pump 7 and valve 12a. It will be evident, however, that in normal operation the aqueous solution will constitute only a minor portion of the total caustic introduced into the vapor separating chamber. During the passage of the caustic through this chamber, the vapors evolved are withdrawn through outlet 13. The chamber may be maintained under vacuum to lower the distillation temperature but this is not necessary and the vapors may be taken off at ordinary pressures or even at elevated pressures and suitably treated as desired. If desired, an inert vapor such as steam or an inert gas may be passed through the vapor separating chamber to carry off water vapor formed, or to lower the water vapor pressure in the separating chamber or to do both.

The substantially anhydrous caustic thus formed passes through pipe 6 to pump 7 and thence is impelled through pipe 8 into the heating coils 2, 3, where its temperature is again raised to around 400° C. A minor portion of this heated caustic is then separated and conducted to a reservoir 10 from whence it may be bailed into suitable containers or otherwise suitably collected. The reservoir may be maintained at a high temperature by insulation or heating so as to retain the caustic in the liquid phase. The major portion of the fused caustic passes through pipe 5 to be again introduced into the vapor separating chamber 4.

In order to avoid heat loss in the system, it is preferable to provide the pipes and the vapor separating chamber with adequate insulation or with heating jackets.

The pipes, the pump, and the vapor separating chamber themselves may be constructed of suitable material not subject to excessive corrosion. Silver has been found to be especially suitable for this purpose and the pipes or separating chamber may be constructed either wholly of silver or may be lined with it. Where pipes are exposed to hot combustion gases, as for example the coils within the furnace, the silver should be protected by some coating more resistant to these gases, for example, chromium, copper, etc.; or, if preferred, the heating coils may be constructed of iron, alloy steel, or copper and provided with silver linings. In case contamination by nickel or iron compounds is permissible, the equipment may be made entirely or in part of nickel, iron or alloys of either.

In Fig. 2 an arrangement is shown somewhat similar to that of Fig. 1. The furnace 21 is provided in the flue thereof with a heating coil 22 having an inlet 23 for the introduction of aqueous caustic solution. The heating coil 22 is connected by means of pipe 24 to one end of a vapor separating chamber 25 having a vapor outlet 26 and a liquid outlet 27, the latter being disposed at the end of the vapor separating chamber remote from the inlet end. A pump 28 is provided on pipe-line 27 for impelling liquid through the pipe-line and through a coil 29, 29' within the furnace and through pipe 30 to the vapor separating chamber. An additional heating coil 31 is provided within the furnace and connected by means of a valve-controlled pipe 32 to the pipe 30 for use when it is desired to further elevate the temperature of the caustic, for example when it is desired to subject the caustic to a settling treatment as is known in the art. This coil is connected at its end remote from pipe 32 with an outlet pipe 33.

In the operation of this embodiment of the invention the aqueous sodium hydroxide of 50 to 75° concentration, is introduced at 23, preferably sufficiently hot to flow readily through this coil,—for example, at a temperature of 120° C. It passes up through coil 22 wherein it is heated to a temperature around 200° C., then passes up through insulated pipe 24 into the end of the vapor separator 25 wherein it mingles with hot substantially anhydrous caustic at a temperature of about 400° C. supplied from coil 29, 29' by means of pipe 30; whereby water is immediately expelled from the aqueous caustic and passes off from the chamber 25 by means of vapor outlet 26. The resultant stream of substantially anhydrous caustic, the temperature of which has been reduced by the vaporization process to about 370° C., flows through insulated pipe 27 to pump 28 which forces it through coil 29, 29' where it is reheated to about 400° C., and back to pipe 30. A portion of the stream flowing through pipe 30, is withdrawn through pipe 32, and introduced into coil 31 wherein it is further heated to a temperature of around 460° C. and then may be passed to settling apparatus for treatment in known manner.

In each of the apparatuses illustrated the vapor separating chamber has been shown merely as a long drum having an inlet for substantially anhydrous caustic and an inlet for aqueous caustic at one end, the anhydrous caustic being introduced at one side of the tank at right angles to the stream of aqueous caustic and the vapor separation being effected during the passage of the stream lengthwise through the drum. Conventional means for bringing the aqueous caustic into better contact with the anhydrous caustic to promote rapid heat exchange may, of course, be provided in this or some other type of separating chamber. Baffles or agitators may be provided for this purpose. Or the aqueous solution may be introduced onto the stream of anhydrous caustic as a relatively thin film on the surface thereof so that it will be heated by surface contact with the anhydrous caustic but will be maintained as a film between the anhydrous caustic and the vapor space within the separating chamber, and consequently can readily give up its aqueous vapors.

Although in the above described method of carrying out the process of the present invention the substantially anhydrous sodium hydroxide for supplying heat to the aqueous solution is in turn heated in a pipe coil heater by hot combustion gases, other methods of heating of course may be employed. The anhydrous caustic may be heated, for example, in a heat exchanger in which molten caustic or some other material, such as mercury vapor, diphenyl or diphenyl oxide vapor, or a fused salt, or molten metal alloy may be employed as the heating medium. In this case, of course, the secondary heating medium would require a source of heat of some sort or other and might be heated by a fuel fired or electrically heated boiler or heating coils.

By using one of the secondary heating media mentioned the use of silver in the pipe coils in the furnace may be obviated; for example, in a process in which anhydrous caustic was used as the secondary heating medium the impurities built up by the heating medium would not contaminate the caustic being dehydrated since this would be in a separate system. The formation of impurities in the secondary heating medium would not interfere with the production of a pure dehydrated product and accordingly cheaper materials, such as iron, nickel, etc. might be employed for constructing that part of the heating apparatus subject to maximum temperatures.

I claim:

1. In the process of concentrating aqueous caustic the step which comprises contacting a regulated quantity of the aqueous caustic with a quantity of substantially anhydrous caustic at a temperature above about 330° C. and of sufficient mass to so raise the temperature of the aqueous caustic as to vaporize water therefrom.

2. In the process of preparing substantially anhydrous caustic from an aqueous solution of caustic the step which comprises contacting a regulated quantity of the solution with a quantity of substantially anhydrous caustic of sufficient mass and temperature to vaporize the water from the aqueous caustic.

3. In the process of preparing substantially anhydrous sodium hydroxide from an aqueous solution of sodium hydroxide the step which comprises contacting a regulated quantity of the solution with a quantity of substantially anhydrous sodium hydroxide of sufficient mass and temperature to vaporize the water from the sodium hydroxide solution.

4. The method of dehydrating an aqueous solution of sodium hydroxide, which comprises contacting a regulated quantity of the solution with a quantity of fused substantially anhydrous sodium hydroxide of sufficient mass and temperature to heat the solution to above about 330° C. so as to vaporize water from the solution, and recovering the sodium hydroxide apart from the water vapor.

5. The method of dehydrating an aqueous caustic solution, which comprises adding a regulated quantity of the aqueous caustic to a body of substantially anhydrous caustic of sufficient mass and temperature to raise the temperature of the aqueous caustic sufficiently to vaporize water therefrom, and recovering the caustic apart from the water vapor.

6. The method of dehydrating an aqueous solution of caustic, which comprises maintaining a body of substantially anhydrous caustic at a temperature above that at which water vaporizes from said aqueous solution, adding to said body of caustic a lesser quantity of aqueous caustic solution to be dehydrated, and regulating the addition so that the temperature of the resultant mixture is retained above that required to vaporize water, separating the resultant water vapor, and recovering the resultant substantially anhydrous sodium hydroxide apart from the water vapor.

7. The method of dehydrating an aqueous caustic solution, which comprises circulating substantially anhydrous caustic serially through a heater and a vapor separating chamber, adding the solution to said substantially anhydrous caustic in the vapor separating chamber, withdrawing substantially anhydrous caustic from said vapor separating chamber and reheating it in said heater, withdrawing a portion of said reheated caustic, and introducing another portion thereof into said vapor separating chamber.

8. The method of preparing substantially anhydrous sodium hydroxide, which comprises introducing aqueous sodium hydroxide into a stream of fused substantially anhydrous sodium hydroxide of sufficient mass and temperature to heat the solution so as to vaporize water therefrom, withdrawing said stream of substantially anhydrous caustic and reheating it, recirculating a major portion of said reheated caustic, and withdrawing from said stream a minor portion of the reheated caustic.

9. The method of dehydrating an aqueous solution of sodium hydroxide, which comprises continuously circulating a stream of fused substantially anhydrous sodium hydroxide through a vapor separating chamber, adding to said stream near its point of entry to said vapor separating chamber a smaller quantity of the aqueous solution to be dehydrated and regulating the temperature of the anhydrous sodium hydroxide and the quantity of aqueous solution with respect thereto so that the resultant mixture is maintained at a temperature above that required to vaporize water from the solution, continuously withdrawing water vapor from the separating chamber, and continuously and separately withdrawing the stream of substantially anhydrous sodium hydroxide therefrom.

10. The method of dehydrating an aqueous solution of sodium hydroxide, which comprises continuously heating a stream of substantially anhydrous sodium hydroxide to a temperature of above about 350° C., continuously introducing the stream of caustic into a vapor separating chamber and adding thereto near its point of entry to the vapor separating chamber a relatively small quantity of the aqueous solution to be dehydrated, withdrawing vapors from said separating chamber, separately and continuously withdrawing the stream of substantially anhydrous sodium hydroxide therefrom, continuously reheating at least a major portion of the stream of substantially anhydrous sodium hydroxide, returning at least a major portion of the reheated stream of sodium hydroxide to said vapor separating chamber, and withdrawing and separately collecting a minor portion of substantially anhydrous sodium hydroxide from said stream thereof.

11. The method of dehydrating an aqueous solution of sodium hydroxide, which comprises continuously heating a stream of substantially anhydrous sodium hydroxide to a temperature of about 400° C., continuously introducing the stream of causitc into a vapor separating chamber and adding thereto near its point of entry to the vapor separating chamber a relatively small quantity of the aqueous solution to be dehydrated, withdrawing vapors from said separating chamber, separately and continuously withdrawing the stream of substantially anhydrous sodium hydroxide therefrom, continuously reheating at least a major portion of the stream of substantially anhydrous sodium hydroxide, returning at least a major portion of the reheated stream of sodium hydroxide to said vapor separating chamber, and withdrawing and separately collecting a minor portion of substantially anhydrous sodium hydroxide from said stream thereof.

12. The method of dehydrating an aqueous solution of sodium hydroxide, which comprises continuously circulating a stream of sodium hydroxide serially through a vapor separating chamber and a heating coil, supplying heat to said stream of sodium hydroxide in said heating coil so as to raise the temperature thereof to above about 350° C., introducing the stream of sodium hydroxide at this temperature into the vapor separating chamber, adding to the stream of sodium hydroxide flowing through the vapor separating chamber and near its point of entry thereto a limited quantity of aqueous sodium hydroxide whereby water is vaporized from the aqueous sodium hydroxide and the temperature of the stream of sodium hydroxide is reduced to above about 330° C., withdrawing the stream of sodium hydroxide from the vapor separating chamber at this temperature and introducing it into the heating coil to reheat it to above about 350° C., reintroducing the stream of sodium hydroxide into the vapor separating chamber, and removing a portion of the sodium hydroxide from the stream thereof subsequent to its withdrawal from the vapor separating chamber and prior to its reintroduction thereto.

13. The method of dehydrating an aqueous solution of sodium hydroxide, which comprises continuously circulating a stream of sodium hydroxide serially through a vapor separating chamber and a heating coil, supplying heat to said stream of sodium hydroxide in said heating coil so as to raise the temperature thereof to about 400° C., introducing the stream of sodium hydroxide at this temperature into the vapor separating chamber, adding to the stream of sodium hydroxide flowing through the vapor separating chamber and near its point of entry thereto a limited quantity of aqueous sodium hydroxide whereby water is vaporized from the aqueous sodium hydroxide and the temperature of the stream of sodium hydroxide is reduced to about 370° C., withdrawing the stream of sodium hydroxide from the vapor separating chamber at this temperature and introducing it into the heating coil to reheat it to about 400° C., reintroducing the stream of sodium hydroxide into the vapor separating chamber, and removing a portion of the sodium hydroxide from the stream thereof subsequent to its withdrawal from the vapor separating chamber and prior to its reintroduction thereto.

14. In the process of preparing substantially anhydrous caustic from an aqueous caustic solution, the step which comprises contacting a regulated quantity of the solution with hot substantially anhydrous caustic so as to vaporize water from the solution and produce substantially anhydrous caustic therefrom.

15. In the process of preparing substantially anhydrous caustic from an aqueous caustic solution of about 75% concentration, the step which comprises contacting a regulated quantity of the solution with hot, substantially anhydrous caustic to rapidly vaporize the water from the aqueous solution and produce substantially anhydrous caustic therefrom.

ARNOLD HANCHETT.